United States Patent Office 3,694,266
Patented Sept. 26, 1972

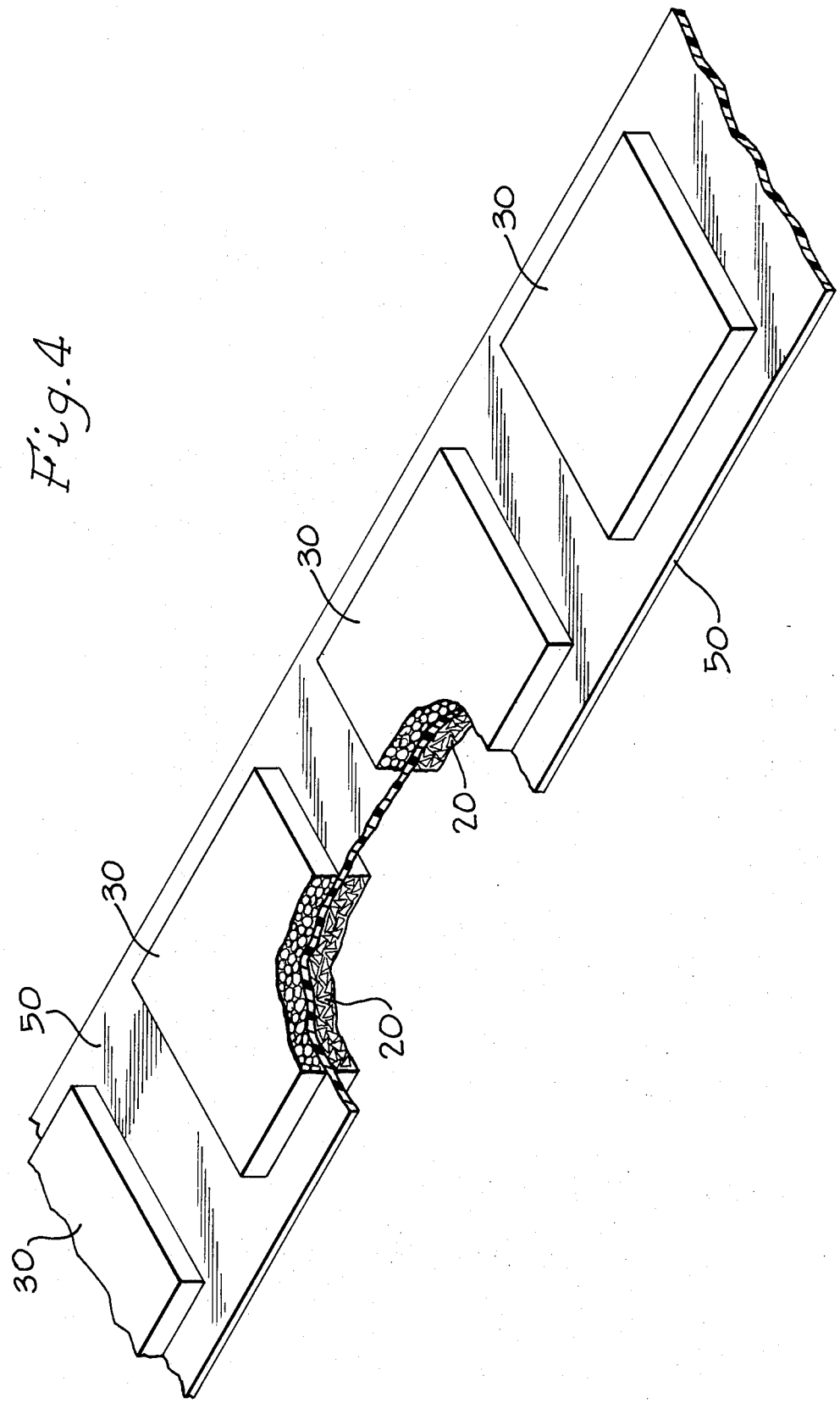

3,694,266
METHOD OF ASSEMBLING MULTICELL BATTERIES COMPRISING DUPLEX ELECTRODE CONSTRUCTION USING CONTINUOUS ELECTRICALLY CONDUCTIVE PLASTIC CARRIER STRIP
Bernard C. Bergum, Monona, John M. Bilhorn, Edgerton, and Kenneth H. Kenyon, William R. Macaulay, and John A. Youngquist, Madison, Wis., assignors to ESB Incorporated
Filed Dec. 21, 1970, Ser. No. 100,257
Int. Cl. H01m 21/00
U.S. Cl. 136—111                                    5 Claims

ABSTRACT OF THE DISCLOSURE

Duplex electrodes are constructed by placing intermittent deposits of positive and negative electrodes on opposite sides of a continuous, electrically conductive plastic carrier strip. The duplex electrodes are then assembled into multicell batteries. The assembly preferably occurs while the duplex electrodes are structurally and electrically connected by the continuous plastic carrier strip after which the carrier strip is subsequently cut between duplex electrodes to obtain structurally and electrically unconnected batteries. Alternatively, the carrier strip may be cut between duplex electrodes before those electrodes are assembled into multicell batteries.

BACKGROUND OF THE INVENTION (1) Field of the invention

This invention concerns duplex electrodes (also known as bipolar electrodes) in which deposits of positive and negative electrodes are intermittently placed on opposite sides of a continuous, electrically conductive plastic carrier strip. The methods of constructing duplex electrodes and of assembling those electrodes into multicell batteries are claimed, as are the batteries.

(2) Description of the prior art

In the construction of a multicell battery three essential requirements must be met: a member which is impervious to the electrolyte of the battery must be used between adjacent cells to seal one cell from the next; some means must be provided by which electrical current may be conducted between the positive electrode in one cell and the negative electrode in an adjacent cell; and the electrolyte impervious member and the electrical conductor means must not create any undesired reactions in the battery. Other desirable attributes are that there be low electrical resistances between the positive electrode of one cell and the negative electrode of an adjacent cell and that the battery be constructed using inexpensive materials and methods.

One technique for constructing multicell batteries is with the use of duplex electrodes, also known as bipolar electrodes. A duplex electrode is a separately constructed assembly in which an electrolyte impervious, electrochemically nonreactive member which eventually divides one cell from an adjacent cell has a positive electrode on one side and a negative electrode on the other side. After being so constructed, the duplex electrode is subsequently assembled into a multicell battery. The electrolyte impervious, electrochemically nonreactive member will also meet the third essential requirement if it is made from an electrically conductive material.

SUMMARY OF THE INVENTION

With this invention duplex electrodes are constructed by placing positive and negative electrodes in contact with opposite sides of a continuous, electrically conductive plastic carrier strip. Use of the carrier strip as a substrate permits the positive and negative electrodes to be made from compositions which, during the construction of the duplex electrode, are unable or poorly suited to function as a substrate. Use of an electrically conductive carrier strip permits electrical current to be conducted between the electrodes without additional components or assembly steps.

The positive and negative electrodes are applied in intermittent deposits along the carrier strip with a deposit of positive electrode being centered opposite a deposit of negative electrode. During this construction process the resulting duplex electrodes are structurally and electrically connected together. The structural connection is desirable because high speed production machinery is better able to process flexible continuous strips than individual pieces. The duplex electrodes are then assembled into multicell batteries. The assembly preferably occurs while the duplex electrodes are structurally and electrically connected by the continuous plastic carrier strip after which the carrier strip is subsequently cut between duplex electrodes to obtain structurally and electrically unconnected batteries. Alternatively, the carrier strip may be cut between duplex electrodes before those electrodes are asembled into multicell batteries.

BRIEF DESCRIPTION OF THE DRAWINGS

FIG. 4 illustrates a portion of the electrically conductive carrier strip with patches of positive and negative electrodes placed on the opposite sides thereof.

DESCRIPTION OF THE PREFERRED EMBODIMENTS

Figure 1:
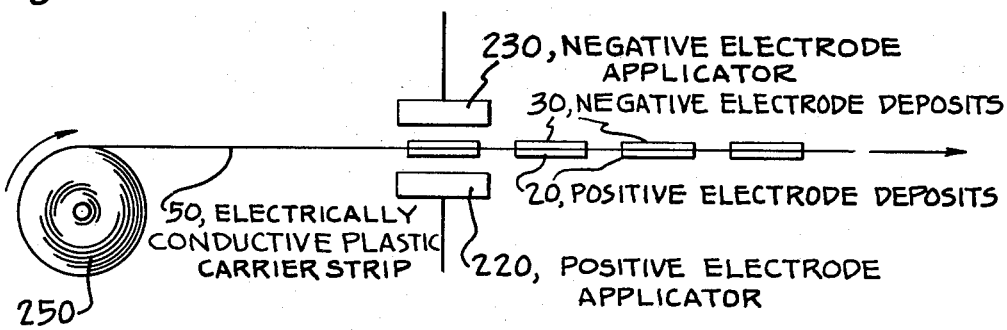
FIG. 1 is a schematic diagram showing a continuous, electrically conductive plastic carrier strip being passed to the applicators which place intermittent deposits of positive and negative electrodes in contact with the carrier strip.

FIG. 1 is a schematic diagram showing a continuous, electrically conductive plastic carrier strip 50 from a roll or some other source of supply 250 being passed to the positive and negative electrode applicators 220 and 230, respectively, where the applicators place intermittent patch deposits of positive and negative electrodes 20 and 30, respectively, on opposite sides of the carrier strip from each other. Each patch deposit of negative electrode is substantially opposite a patch deposit of positive electrode. The applicators 220 and 230 may be spaced opposite one another so that they make their opposing patch deposits simultaneously, or they may be spaced apart so that one applicator first makes its patch deposit and later the other applicator makes the opposing patch deposit. FIG. 4 illustrates a portion of the electrically conductive carrier strip with patches of positive and negative electrodes placed on the opposite sides thereof. It will be understood by those skilled in the art that a segment of the carrier strip having a positive and negative electrode on its opposite sides defines a duplex electrode, also known as a bipolar electrode. As can be seen from FIGS. 1 and 4, the duplex electrodes are structurally and electrically connected together immediately after the carrier strip passes by the second of the two applicators; these physical and electrical connections between duplex electrodes subsequently must be broken, but this can be done either before or after the duplex electrodes are assembled into multicell batteries.

Figure 2:
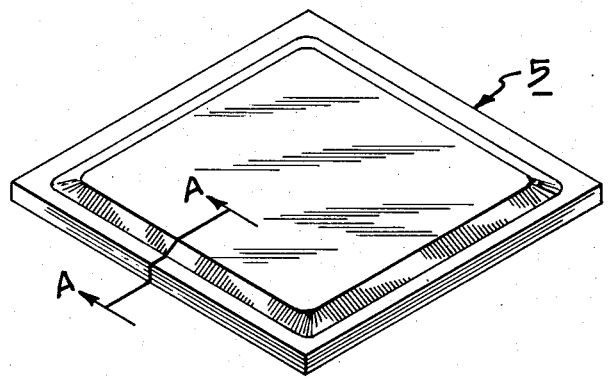
FIG. 2 is an oblique view of a multicell battery containing duplex electrodes made according to this invention.
Figure 3:
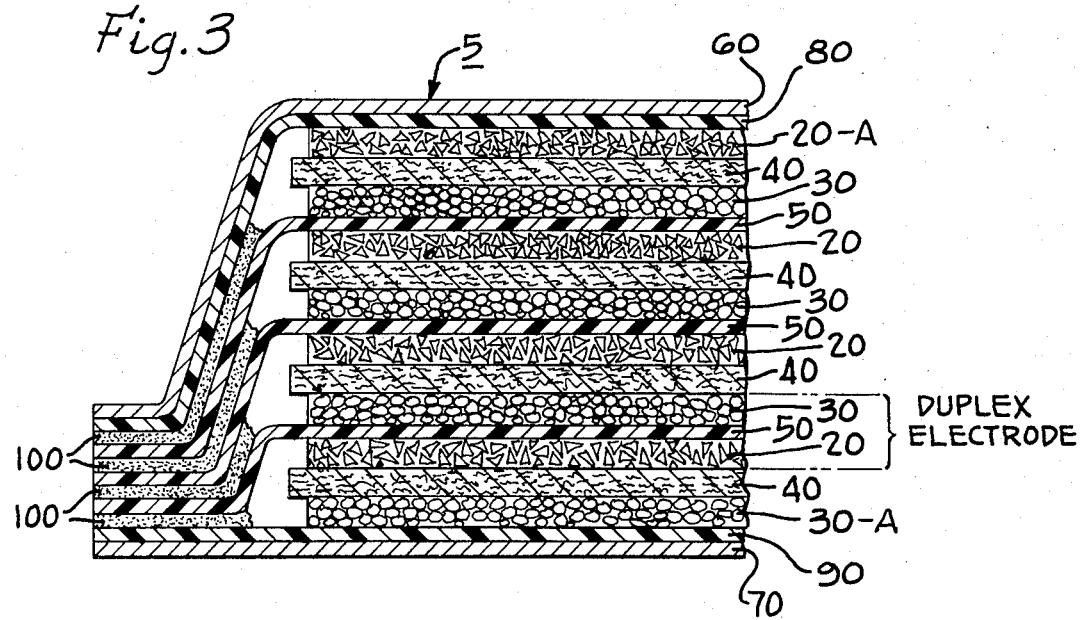
FIG. 3 illustrates a typical cross-section of the battery shown in FIG. 2 taken along the line A—A of FIG. 2. The thickness of the battery is shown greatly magnified for purposes of illustration.

The eventual mutlicell battery product is the same whether the duplex electrodes constructed as shown in FIG. 1 are assembled into multicell batteries before or after being structurally and electrically unconnected from each other. FIG. 2 shows such a multicell battery 5 in an oblique view. FIG. 3 shows a portion of the multicell battery 5 in magnified cross-section an illustrates members of the battery, each of which will be described in greater detail in subsequent paragraphs. As FIG. 3 shows, the battery 5 comprises the combination of an outer positive electrode 20–A, an outer negative electrode 30–A, and at least one duplex electrode between electrodes 20–A and 30–A, each duplex electrode being of the type constructed by the method shown in FIG. 1. As shown in FIG. 3, a duplex electrode comprises the combination of a segment of electrically conductive plastic carrier strip which functions as the intercell connector of the duplex electrode, together with deposits of positive and negative electrodes 20 and 30 respectively on the opposite sides of the segment. The multicell battery 5 also includes an electrolyte impregnated separator 40 between each positive electrode 20 or 20–A and each negative electrode 30 or 30–A. The multicell battery thus includes at least two cells, each cell comprising the combination of a positive electrode 20 or 20–A, a negative electrode 30 or 30–A and an electrolyte impregnated separator 40 between the electrodes. Liquid impervious layers 80 and 90 which also function as current conducting means are in contact with the outer electrodes 20–A and 30–A respectively. Metal current collectors 60 and 70 which also function as vapor barriers are on the outside of layers 80 and 90. Electrolyte impervious sealing means and electrical insulating means around the electrolyte impregnated separators 40 are designated by the numeral 100.

Numerous advantages result from the construction illustrated schematically in FIGS. 1 and 4 and described above. Use of the carrier strip as a substrate permits the electrodes to be made from compositions which, during the construction of the duplex electrodes, are unable or poorly suited to be produced as continuous strips. Examples of electrodes which are unable or poorly suited to be produced as continuous strips include electrodes comprising particles of active material contained in and dispersed throughout a porous matrix; flame spray deposits; and vapor deposits.

The conductive carrier strip also permits current to be conducted between the positive and negative electrodes in a duplex electrode without the use of any other electrically conductive members.

The electrically conductive plastic also has the advantage of being electrochemically inert in the battery. While continuous carrier strips made from metals such as zinc, aluminum, or steel could be used to achieve some of the advantages attained with this invention, these metals tend to produce unwanted electrochemical reactions with the electrodes on one or both sides of the carrier strip unless the strips are coated on one or both sides with an electrolyte impervious, electrically conductive, electrochemically nonreactive material. Metal carrier strips which by themselves are electrochemically nonreactive, such as titanium, tantalum or gold are excessively expensive.

The use of the continuous carrier strip as a substrate along which intermittent deposits of electrodes are applied is also advantageous from the viewpoint of manufacturing techniques. Modern high speed production machinery is better able to handle flexible, continuous strips with deposits than a succession of flexible, individual pieces. Maximum advantage of this principle may be attained in conjunction with this invention by using the continuous strip as a processing implement throughout the construction of duplex electrodes and the subsequent assembly of those electrodes into multicell batteries, leaving the step of cutting the carrier strip into segments until all other assembly steps required to assemble the multicell batteries have been taken. In this regard, it is preferred to assemble a plurality of structurally and electrically unconnected multicell batteries by beginning with the construction of duplex electrodes which are structurally and electrically connected together by the continuous electrically conductive plastic carrier strip. This consists of placing intermittent deposits of positive and negative electrodes on the carrier strip as shown in FIG. 1 so that each patch deposit of negative electrode is on the other side of the strip from and substantially centered opposite a patch deposit of positive electrode. The next step in the preferred process consists of assembling multicell batteries which are structurally and electrically connected together by at least one of the carrier strips having positive and negative electrodes deposited thereon, a step which comprises the acts of: placing in alignment at least one such carrier strip between outer positive and outer negative electrodes so that a duplex electrode is between an outer positive electrode and an outer negative electrode; placing an electrolyte impregnated separator between each positive and negative electrode; sealing around the perimeter of each electrolyte impregnated separator to produce a liquid impervious seal; Sealing a liquid impervious layer around the electrodes and electrolyte impregnated separators; and, connecting to each outer positive electrode electrically conductive means which extend to the exterior of the liquid impervious lyaer and connecting to each outer negative electrode additional electrically conductive means which extend to the exterior of the liquid impervious layer. After the multicell batteries have been so assembled, each carrier strip is then cut between duplex electrodes to obtain structurally and electrically unconnected multicell batteries; the carrier strip may be cut between each successive pair of duplex electrodies, or it may be cut into increments each of which contains two or more duplex electrodes so that the resultant batteries structurally connected by the increment are electrically connected in parallel. During the assembly of the multicell batteries additional components may be processed in the form of continuous strips; alternatively, each of these additional components may also comprise a succession of structurally unconnected components placed along the continuous conductive plastic carrier strip.

FIG. 3 is helpful in illustrating these concepts. The multicell battery 5 shown in FIG. 3 may be made by using three of the electrically conductive plastic carrier strips 50 with positive and negative electrodes 20 and 30 applied intermittently on the opposite sides of each as shown in FIGS. 1 and 4. The electrolyte impregnated separators 40 shown in FIG. 3 were assembled into the battery as structurally unconnected components. The components 60, 70, 80 and 90 were assembled into the multicell battery 5 as continuous strips, although they also could have been components which have no structural connection with each other when assembled into successive multicell batteries. The cutting of the three electrically conductive plastic carrier strips plus the cutting of any other continuous strips used in constructing the multicell battery 5 may be the last step in the construction of a plurality of multicell batteries, thereby retaining the advantages of processing continuous strips rather than individual unconnected pieces for as much of the assembly process as possible.

It is not essential that the cutting of the continuous, electrically conductive plastic carrier strip into structurally and electrically unconnected duplex electrodes be postponed until all other steps in the assembly of multicell batteries are complete. The cutting of the strips may, for instance, be done immediately after the positive and negative electrodes are applied intermittently on opposite sides of the carrier strips and the unconnected duplex electrodes may then be assembled into multicell batteries. If this sequence of steps is taken, then the assembly of a multicell battery after the cutting of the carrier strip comprises: placing at least one of the structurally and electrically unconnected duplex electrodes between an outer positive electrode and an outer negative electrode; placing an electrolyte impregnated separator between each positive and negative electrode; sealing around the perimeter of each electrolyte impregnated separator to produce a liquid impervious seal; sealing a liquid impervious layer around the electrodes and electrolyte impregnated separators; and, connecting to the outer positive electrode electrically conductive means which extend to the exterior of the liquid impervious layer and connecting to the outer negative electrode additional electrically conductive means which extend to the exterior of the liquid impervious layer. The unconnected duplex electrodes could be assembled into multicell batteries as described above in a process in which some other component of the finally constructed batteries was used in the form of a continuous carrier strip during some or all of the assembly steps; for instance, the outside layers could be continuous carrier strips and the duplex electrodes, electrolyte impregnated separators, and outer electrodes could then be placed along those continuous strips, with the cutting of those strips to produce structurally unconnected multicell batteries being postponed until after all other assembly steps have been concluded.

The composition of each of several of the members in the battery may take alternative forms, and the compositions of those members will now be discussed.

The positive electrodes 20 and 20-A may each comprise particles of electrochemically positive active material contained in and dispersed throughout a binder matrix. The positive active material conventionally is divided into tiny particles so as to increase the rate at which the electrochemical reactions can occur by increasing the surface area where they occur. The binder increases the electronic conductivity of the duplex electrode, increases the structural integrity within the positive electrode, and adheres the positive electrode to the carrier strip. Since electrolyte must have access to the surface of the active material particles, the electrode must be made sufficiently porous so that the electrolyte may diffuse throughout the electrode rapidly and thoroughly. Preferably the pores in the electrode are produced by the evaporation of liquid during the construction of the electrode; the evaporating liquid may be part of a dispersion binder system in which the solid binder contained in the finally constructed electrode comprises tiny particles of binder material dispersed throughout and not dissolved in the liquid while the electrode is being constructed, or the evaporating liquid may be part of a solution binder system in which the solid binder contained in the finally constructed electrode is dissolved in the liquid which is later evaporated. The porosity of the positive electrodes may be increased as the discharge rate desired in the battery is increaased. Electrodes may also be constructed using combinations of the dispersion and solution systems. Alternatively, the pores might be produced by the dissolving of a solid which was present during construction of the electrode or by passing gases through or generating gases within the electrodes at controlled rates during electrode construction. The positive electrodes 20 and 20-A may, and preferably will also contain amounts of a good electrical conductor such as carbon or graphite to improve the electrical conductivity between the active material particles, the positive active material particles themselves generally being relatively poor conductors of electricity. The conductivity of the active material particles together with the conductivity of the binder itself will influence the amounts of conductors added to the electrode. The electrodes 20 and 20-A may also contain if desired small amounts of additional ingredients used for such purposes as maintaining uniform dispersion of active material particles during electrode construction, aiding the diffusion of electrolyte through the pores of the finally constructed electrodes, controlling viscosity during processing, controlling surface tension, controlling pot life, or for other reasons.

The negative electrodes 30 and 30-A may comprise spray or vapor deposits of metals or may comprise tiny particles of metals contained in and dispersed throughout a binder matrix. If the negative electrodes utilize a binder matrix, in general the same considerations regarding that matrix apply to the negative electrodes as do for the positive electrodes except that no electrical conductor may be needed to achieve desired electrical conductivity between the active material particles since the negative active materials are generally better conductors than are the positive materials. When the negative electrodes utilize a binder matrix, the binder system need not be the same as the one used in the positive electrodes, and even if it is the proportions of binder, active material particles, and other ingredients in the negative electrodes may have a different optimum than the proportions of analogous ingredients in the positive electrode. The initial porosity of the negative electrodes may sometimes be less than that of the positive electrodes, since the negative electrode discharge reaction products are sometimes dissolved in the battery electrolyte. The porosity of the negative electrodes may be increased as the discharge rate desired in the battery is increased. The negative electrodes 30 and/or 30-A may also comprise thin sheets or foils of electrochemically negative material.

It is apparent that electrodes which comprise particles of active material would be unable or poorly suited to be produced as continuous strips. They should therefore be deposited upon a substrate which, in the case of this invention is the electrically conductive plastic carrier strip.

Between each positive electrode 20 and 20-A and each negative electrode 30 and 30-A is an electrolyte impregnated separator 40, the theoretical requirements of which are that it contain electrolyte as well as physically separate and prevent contact between the electrodes. A deposit of gelled electrolyte could by itself serve both functions if of proper thickness and/or consistency. The alternative construction uses a deposit of gelled or fluid electrolyte with a separator which is distinct from and in addition to the electrolyte, the separator providing added insurance against direct contact between the electrodes and acting as an absorbent material into which the electrolye may be impregnated. Both alternative constructions may, however, be viewed as being forms of electrolyte impregnated separators. Where the separator is distinct from and in addition to the electrolyte, the separator may be made from a wide variety of materials including the fibrous and cellulosic materials which are conventional in battery construction as well as from woven or nonwoven fibrous materials such as polyester, nylon, polyethylene and glass.

Another essential of the multicell battery 5 is a liquid impervious layer comprising members 80 and 90 sealed around the electrodes and electrolyte impregnated separators as shown in FIG. 3. When a battery is in storage waiting to be placed into service there is an opportunity for liquids from the electrolyte to escape from the battery, leaving the battery incapable of performing as desired when later placed into use. Also during discharge the battery may produce liquid byproducts which are corrosive, poisonous, or otherwise harmful, and it is desirable to prevent these liquids from escaping from the battery. The liquid impervious layer provides means for preventing or minimizing the loss of these liquids.

The multicell battery 5 must also be provided with means for conducting electrical current between the outer positive electrod 20-A and the exterior of the liquid impervious layer and additional means for conducting electrical current between the outer negative electrode 30-A and the exterior of the liquid impervious layer. This additional requirement of the battery may be met by the liquid impervious layer members 80 and 90 themselves by constructing those members from a conductive material such as an electrochemically inert, electrically conductive plastic, and such a construction is shown in FIG. 3. As an alternative to the conductive plastic, metals which are either themselves electrochemically nonreactive or are made so by appropriate conductive, nonreactive coatings may be used for the liquid impervious layer. Another alternative construction not illustrated in the drawings is to use a liquid impervious layer which is made from an electrically nonconductive material and then extend separate conductve means from the end electrodes 20–A and 30–A through or around the edge of the nonconductive, liquid impervious layer so that current may be withdrawn from the battery. It is to be understood that all of these alternative constructions are encompassed by the general statement that a liquid impervious layer is sealed around the electrodes and electrolyte impregnated separators, that electrically conductive means are connected to the outer positive electrode 20–A which extend to the exterior of the liquid impervious layer, and that additional electrically conductive means are connected to the outer negative electrode 30–A which extend to the exterior of the liquid impervious layer.

Two additional components, members 60 and 70, are shown in FIG. 3 and are illustrated because they may be used in the construction of the multicell battery produced by this invention. It should be understood, however, that the present invention does not require the use of members 60 and 70. Those members are metal foils or sheets, e.g., steel foil, which function both as vapor barriers to prevent evaporation of electrolyte from the battery and as current collecting means. Where a nonmetallic, nonconductive vapor barrier is used instead of steel foil, additional means must be provided to conduct current from the exterior of the liquid impervious layer (members 80 and 90) to the exterior of the vapor barrier. Where vapor barriers such as the members 60 and 70 shown in FIG. 3 are used in the battery, they may be laminated to the liquid impervious layers 80 and 90 if desired.

Liquid impervious sealing means must be provided around each electrolyte impregnated separator 40 to prevent electrolyte loss from the battery and to prevent the electrolyte of one cell from migrating to another cell around the perimeter of an intercell connector. Adhesive members 100 shown in FIG. 3 may serve as the needed liquid impervious sealing means. By being made from an electrically nonconductive adhesive, members 100 also serve an additional purpose, that of preventing undesired electrical connections between the electrically conductive intercell connector and other electrically conductive members of the battery.

The electrically conductive plastic used in the continuous carrier strip 50 and also shown in items 80 and 90 in FIG. 3 may be produced by casting, extrusion, calendaring, or other suitable techniques. The conductive plastics may be made, for example, from materials such as polymers loaded with electrically conductive particles and containing various stabilizers and/or plasticizers. The conductive particles may be carbonaceous materials such as graphite or acetylene black, or metallic particles may also be used. Polymers which by themselves are sufficiently conductive may also be used. The conductive plastic, whether loaded or unloaded, must be made from a composition which is compatible with other components of the battery. For batteries using Leclanché and moderately concentrated alkaline electrolytes, the conductive plastic may be made for example, from materials such as polyacrylates, polyvinyl halides, polyvinylidene halides, polyacrylonitriles, copolymers of vinyl chloride and vinylidene chloride, polychloroprene, and butadiene-styrene or butadiene-acrylonitrile resins. For batteries using strongly alkaline electrolytes, polyvinylchloride and polyolefins such as polyethylene and polyisobutylene may be used in the preparation of the conductive plastic. For batteries using acid electrolytes such as sulfuric acid, polyvinyl halides, copolymers of vinyl chloride, and vinylidene chloride may be used.

While it is preferred to employ the Leclanché electrochemical system (comprising manganese dioxide positive active material, zinc negative active material, and an electrolyte comprising ammonium chloride and/or zinc chloride), the multicell battery 5 of this invention may employ a wide variety of positive and negative electrode materials and a wide variety of electrochemical systems including both primary and secondary systems. Among the positive electrode materials are such commonly used inorganic metal oxides as manganese dioxide, lead dioxide, nickel oxyhydroxide, mercuric oxide and silver oxide, inorganic metal halides such as silver chloride and lead chloride and organic materials capable of being reduced such as dinitrobenzene and azodicarbonamide compounds. Among the negative electrode materials are such commonly used metals as zinc, aluminum, magnesium, lead, cadmium, and iron. This invention may employ the electrolytes commonly used in the Leclanché system (ammonium chloride and/or zinc chloride), various alkaline electrolytes such as the hydroxides of potassium, sodium and/or lithium, acidic electrolytes such as sulfuric or phosphoric acid, and nonaqueous electrolytes, the electrolytes of course being chosen to be compatible with the positive and negative electrodes.

Among the wide variety of electrochemical systems which may be used in the multicell battery 5 are those in which the positive electrodes comprise manganese dioxide, the negative electrodes comprise metals such as zinc, aluminum, or magnesium, and the electrolyte substantially comprises an acidic solution of inorganic salts. Another commonly known system useful in the battery 5 is the alkaline manganese system in which the positive electrodes comprise manganese dioxide, the negative electrodes comprise zinc, and the electrolyte substantially comprises a solution of potassium hydroxide. Other aqueous electrolyte systems including those of nickel-zinc, silver-zinc, mercury-zinc, mercury-cadmium, and nickel cadmium may also be used. Systems employing organic positive electrodes and acidic electrolytes may also be used, including rechargeable systems using avodicarbonamide compound electrodes and Leclanché electrolyte.

We claim.

1. The method of constructing structurally and electrically unconnected multicell batteries comprising the steps of:
    (a) constructing duplex electrodes which are structurally and electrically connected together along a continuous, electrically conductive plastic carrier strip, each duplex electrode comprising a segment of the strip, a positive electrode on one side of that segment, and a negative electrode on the other side of that segment, the method of constructing the duplex electrodes comprising the steps of
        (i) placing intermittent deposits of a positive electrode along the carrier strip, and
        (ii) placing intermittent deposits of a negative electrode along the carrier strip, each deposit of negative electrode being on the other side of the strip from and substantially opposite a deposit of positive electrode; then,
    (b) assembling multicell batteries which are structurally and electrically connected together by at least one of the carrier strips having positive and negative electrodes deposited thereon, the method of constructing the multicell battery comprising the steps of
        (i) placing at least one of the carrier strips with the positive and negative electrodes deposited thereon between outer positive electrodes and outer negative electrodes so that a duplex electrode is between an outer positive electrode and an outer negative electrode, (ii) placing an electrolyte impregnated separator between each positive and negative electrode, (iii) sealing around the perimeter of each electrolyte impregnated separator to produce a liquid impervious seal, (iv) sealing a liquid impervious layer around the electrode and electrolyte impregnated separators, and (v) connecting to each outer positive electrode electrically conductive means which extend to the exterior of the liquid impervious layer and connecting to each outer negative electrode additional electrically conductive means which extend to the exterior of the liquid impervious layer; and then, (c) cutting each carrier strip between duplex electrodes to obtain structurally and electrically unconnected multicell batteries.

2. The method of constructing a multicell battery comprising the steps of:

(a) constructing duplex electrodes which are structurally and electrically connected together along a continuous, electrically conductive plastic carrier strip, each duplex electrode comprising a segment of the strip, a positive electrode on one side of that segment, and a negative electrode on the other side of that segment, the method of constructing the duplex electrodes comprising (i) placing intermittent deposits of a positive electrode along the carrier strip, and (ii) placing intermittent deposits of a negative electrode along the carrier strip, each deposit of negative electrode being on the other side of the strip from and substantially opposite a deposit of a positive electrode; then, (b) cutting each carrier strip between duplex electrodes to obtain structurally and electrically unconnected duplex electrodes; and then (c) assembling a multicell battery by (i) placing at least one of the structurally and electrically unconnected duplex electrodes between an outer positive electrode and an outer negative electrode, (ii) placing an electrolyte impregnated separator between each positive and negative electrode.

(iii) sealing around the perimeter of each electrolyte impregnated separator to produce a liquid impervious seal, (iv) sealing a liquid impervious layer around the electrodes and electrolyte impregnated separators, and (v) connecting to the outer positive electrode electrically conductive means which extend to the exterior of the liquid impervious layer and connecting to the outer negative electrode additional electrically conductive means which extend to the exterior of the liquid impervious layer.

3. The method of constructing multicell batteries using a continuous, electrically conductive plastic carrier strip, the carrier strip having a plurality of intermittent deposits of positive electrodes and a plurality of intermittent deposits of negative electrodes, each deposit of negative electrode being on the other side of the strip from and substantially opposite a deposit of positive eelctrode, the method comprising the steps of:

(a) placing the carrier strip between outer positive and outer negative electrodes so that a positive electrode on the carrier strip faces an outer negative electrode and so that a negative electrode on the carrier strip faces an outer positive electrode;

(b) placing an electrolyte impregnated separator between each electrode deposit on the carrier strip and the outer electrode facing it;

(c) sealing liquid impervious layers around the electrodes deposited on the carrier strip so that each electrode on the carrier strip is surrounded by a liquid impervious seal; and (d) connecting to each outer positive electrode electrically conductive means which extend to the exterior of the liquid impervious layers and connecting to each outer negative electrode additional electrically conductive means which extend to the exterior of the liquid impervious layers.

4. The method of claim 3 in which the carrier strip is subsequently cut between the intermittent deposits along the strip to obtain structurally and electrically unconnected multicell batteries.

5. The method of constructing multicell batteries using a continuous, electrically conductive plastic carrier strip, the carrier strip having a plurality of intermittent deposits of positive electrodes and a plurality of intermittent deposits of positive electrodes and a plurality of intermittent deposits of negative electrodes, each deposit of negative electrode being on the other side of the strip from and substantially opposite a deposit of positive electrode, the method comprising the steps of:

(a) cutting the carrier strip between duplex electrodes to obtain structurally and electrically unconnected duplex electrodes; and then (b) assembling a multicell battery by (i) placing at least one of the structurally and electrically unconnected duplex electrodes between an outer positive electrode and an outer negative electrode, (ii) placing an electrolyte impregnated separator between each positive and negative electrode, (iii) sealing around the perimeter of each electrolyte impregnated separator to produce a liquid impervious seal, (iv) sealing a liquid impervious layer around the electrodes and electrolyte impregnated separators, and (v) connecting to the outer positive electrode electrically conductive means which extend to the exterior of the liquid impervious layer and connecting to the outer negative electrode additional electrically conductive means which extend to the exterior of the liquid impervious layer.

References Cited

UNITED STATES PATENTS

| | | | |
|---|---|---|---|
| 3,563,805 | 2/1971 | Deierhoi, Jr. | 136—111 |
| 3,081,369 | 3/1963 | Coleman et al. | 136—87 |
| 2,844,641 | 7/1958 | Lang et al. | 136—111 |
| 2,971,999 | 2/1961 | Jacquier | 136—6 |
| 2,870,235 | 1/1959 | Soltis | 136—111 |
| 3,004,093 | 10/1961 | Richter et al. | 136—175 |
| 3,004,094 | 10/1961 | Haessly | 136—175 |
| 3,306,777 | 2/1967 | Reid et al. | 136—111 |

ANTHONY SKAPARS, Primary Examiner

U.S. Cl. X.R.

136—10, 175